(12) United States Patent
Tseng et al.

(10) Patent No.: US 11,150,506 B2
(45) Date of Patent: Oct. 19, 2021

(54) DISPLAY MODULE

(71) Applicant: AU OPTRONICS CORPORATION, Hsin-Chu (TW)

(72) Inventors: Li-Wei Tseng, Hsin-Chu (TW); Chih-Kang Wu, Hsin-Chu (TW); Shau-Yu Tsai, Hsin-Chu (TW); Li-Jia Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/657,039

(22) Filed: Oct. 18, 2019

(65) Prior Publication Data
US 2020/0201114 A1 Jun. 25, 2020

(30) Foreign Application Priority Data
Dec. 21, 2018 (TW) .................. 107146529

(51) Int. Cl.
G02F 1/1335 (2006.01)
B32B 3/02 (2006.01)

(52) U.S. Cl.
CPC .......... *G02F 1/133528* (2013.01); *B32B 3/02* (2013.01); *G02F 1/133514* (2013.01); *G02F 2201/501* (2013.01)

(58) Field of Classification Search
CPC ......... G02F 1/133615; G02F 1/133602; G02F 2001/01791; G02F 2001/133614; G02F 1/133617; G02F 2201/44; G02F 2001/133368; G02F 2001/133302; G02F 1/133305; G02F 1/133308; G02F 2001/13332; G02F 2001/133314; G02F 2001/133317; G02F 1/133509; G02F 1/33512; G02F 1/36209; G02F 2001/1351; G02F 1/0107; G02F 1/1339; G02F 1/1341; G02F 2001/133567; G02F 1/133512; G02F 1/01791; G02F 1/133614; G02F 2202/28;
(Continued)

(56) References Cited

U.S. PATENT DOCUMENTS

| 8,159,128 | B2 | 4/2012 | Peter | |
| 2016/0313478 | A1* | 10/2016 | Lee | ..................... H01L 51/0097 |
| 2018/0170009 | A1 | 6/2018 | Kuniyasu | |

(Continued)

FOREIGN PATENT DOCUMENTS

| CN | 101485232 | 7/2009 |
| CN | 104460102 | 3/2015 |

(Continued)

*Primary Examiner* — Mariam Qureshi
(74) *Attorney, Agent, or Firm* — WPAT, PC

(57) ABSTRACT

A display module includes a display panel including two substrates and a display medium sandwiched between the two substrates, a wavelength modulation unit including a carrier substrate and a wavelength modulation layer on the carrier substrate, the carrier substrate having a coefficient of thermal expansion substantially matching coefficients of thermal expansion of the two substrates, an adhesive layer bonding the display panel and the wavelength modulation unit to form a space between the display panel and the wavelength modulation unit, and an optical film interposed in the space to be clamped between the display panel and the wavelength modulation unit.

12 Claims, 6 Drawing Sheets

(58) Field of Classification Search
CPC ........... H01L 51/502; H01L 31/035218; H01L 51/5012; H05B 33/00; G02B 5/003
See application file for complete search history.

(56) References Cited

U.S. PATENT DOCUMENTS

| | | | |
|---|---|---|---|
| 2018/0238519 A1* | 8/2018 | Kuniyasu | G02B 5/20 |
| 2018/0267366 A1 | 9/2018 | Lee | |
| 2019/0025621 A1* | 1/2019 | Shin | H01L 33/502 |
| 2019/0113796 A1* | 4/2019 | Jin | G02F 1/133308 |
| 2019/0187355 A1* | 6/2019 | An | G02B 6/0026 |
| 2019/0204498 A1* | 7/2019 | Lee | G02B 6/00 |
| 2020/0124886 A1* | 4/2020 | Song | G02B 6/0068 |

FOREIGN PATENT DOCUMENTS

| | | |
|---|---|---|
| CN | 106896568 | 6/2017 |
| CN | 106940492 | 7/2017 |
| CN | 207067593 | 3/2018 |
| CN | 107921737 | 4/2018 |

\* cited by examiner

DISPLAY MODULE

BACKGROUND OF THE INVENTION

1. Field of the Invention

The invention generally relates to a display module. Particularly, the invention relates to a display module with the integrated wavelength modulation unit, optical film, and display panel.

2. Description of the Prior Art

Flat display devices have been widely applied to various electronic devices, such as televisions, personal computers, mobile phones, wearable devices, digital cameras, and hand-held video games. However, in order to enhance the visual perception of a user, manufacturers are still continuously improving the optical performance of the display device.

In conventional display devices, optical films are disposed in the backlight module to improve the optical performance. However, as the thinning requirement for display devices becomes higher and higher, the thickness of the backlight module is also required to be extremely thin, resulting in narrower gap between the optical film and the polarizer, that readily causes abrasion of the optical film. In order to avoid the abrasion of the optical film, the optical film is usually adhered to the display device, so that the optical surface is limited to the surface bonding technology, the efficiency is lowered, and the light is liable to cause color shift or uniformity variation due to the bonding. In addition, the coefficients of thermal expansion of the optical film and the substrates of the display panel are usually different, so that the optical film adhered to the display panel is likely to deform under high temperature, resulting in the affected optical surface.

SUMMARY OF THE INVENTION

It is an object of the invention to provide a display module, which integrates the wavelength modulation unit and the display panel to interpose the optical film therebetween and to effectively achieve the optical performance of wide color gamut.

In an embodiment, the invention provides a display module including a display panel including two substrates and a display medium sandwiched between the two substrates, a wavelength modulation unit including a carrier substrate and a wavelength modulation layer on the carrier substrate, the carrier substrate having a coefficient of thermal expansion substantially matching coefficients of thermal expansion of the two substrates, an adhesive layer bonding the display panel and the wavelength modulation unit to form a space between the display panel and the wavelength modulation unit, and an optical film interposed in the space to be clamped between the display panel and the wavelength modulation unit.

In an embodiment, the largest coefficient of thermal expansion of the carrier substrate and the two substrates is equal to or less than twice of the smallest coefficient of thermal expansion of the carrier substrate and the two substrates to match the coefficient of thermal expansion of the carrier substrate with the coefficient of thermal expansion of the two substrates.

In an embodiment, the optical film is disposed in the space in a manner that an air layer is formed between the optical film and the display panel or between the optical film and the wavelength modulation unit.

In an embodiment, the adhesive layer is only bonded to lateral sides of the display panel and the carrier substrate, and a gap is formed between the optical film and the adhesive layer.

In an embodiment, the adhesive layer includes a lateral portion bonding lateral sides of the display panel and the carrier substrate and an extension portion extending from the lateral portion toward the space to bond two facing surfaces of the display panel and the carrier substrate.

In an embodiment, the display panel further includes a light-blocking layer defining a boundary of the display panel, and a width (W) of the extension portion and a width (A) of the boundary satisfies the following equation:

$$0<W/A<0.54.$$

In an embodiment, the display panel further includes a light-blocking layer defining a boundary of the display panel, the adhesive layer is disposed only within a vertical projection of the light-blocking layer, and a width (W') of the adhesive layer and a width (A) of the boundary satisfies the following equation:

$$0.26<W'/A<0.54.$$

In an embodiment, the display module further includes a positioning adhesive layer pre-coated on at least one of the display panel and the carrier substrate to define a relative position of the display panel and the wavelength modulation unit.

In an embodiment, the display panel further includes a light-blocking layer defining a boundary of the display panel, and a vertical projection of the light-blocking layer covers a lateral side of the wavelength modulation unit.

In an embodiment, a connecting line from the lateral side of the wavelength modulation layer to a lateral side of the light-blocking layer includes an angle with the lateral side of the light-blocking layer, and the angle ranges from 30 degrees to 60 degrees.

In an embodiment, the wavelength modulation layer is disposed on a side of the carrier substrate facing the display panel. Alternatively, the wavelength modulation layer is disposed on a side of the carrier substrate facing away from the display panel.

In an embodiment, the wavelength modulation layer includes a quantum dot layer.

In an embodiment, the optical film includes a diffusion film, a prism film, a microlens film, a brightness enhancement film, or a combination thereof.

In an embodiment, the wavelength modulation unit further includes an anti-water/oxygen layer covering the wavelength modulation layer, and the anti-water/oxygen layer has a moisture permeability equal to or larger than $1 \times 10^{-6}$ g/m² per day and smaller than 1 g/m² per day.

In an embodiment, the adhesive layer includes a moisture curable glue or an ultraviolet curable glue.

Compared to the prior art, the display module of the invention has the optical film sandwiched between the display panel and the wavelength modulation unit to effectively achieve the optical performance of wide color gamut to eliminate the attachment problem of the optical film.

DETAILED DESCRIPTION OF THE PREFERRED EMBODIMENT

Figure 1A:
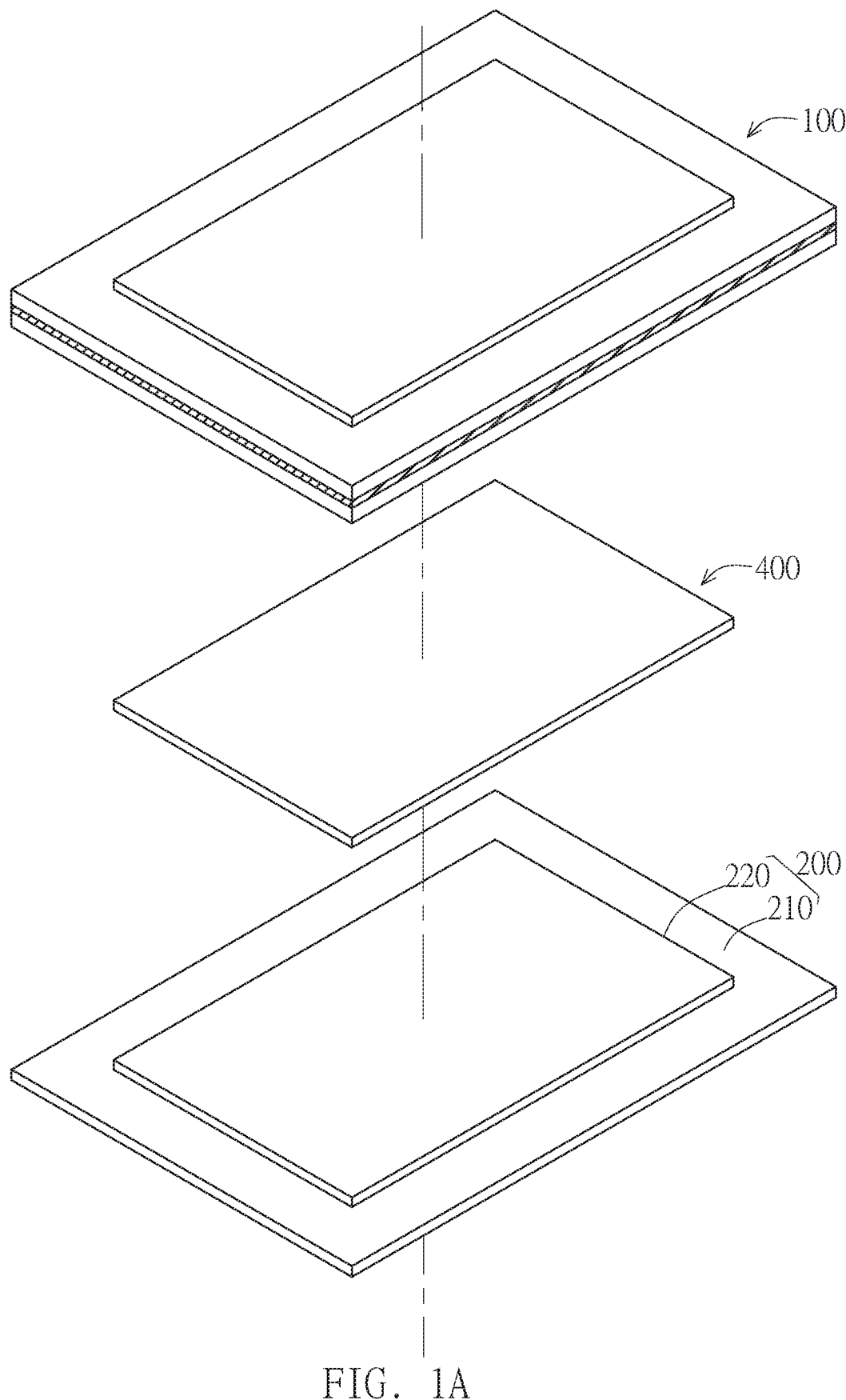
FIG. 1A is an exploded view of an embodiment of the display module of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on or connected to the other element or intervening elements may also be present. In contrast, when an element is referred to as being "directly on" or "directly connected to" another element, there are no intervening elements present.

In addition, the relative terms such as "below" or "bottom" and "above" or "top" may be used herein to describe the relationship of one element to another, as illustrated. It will be understood that the relative terms are intended to encompass different orientations of the device in addition to the orientation shown in the drawings. For example, if the device in the drawings is turned over, the elements described as being "below" the other elements will be oriented on the "upper" side of the other elements. Therefore, the exemplary term "below" may encompass the orientation of "below" and "above" depending on the particular orientation of the drawing. Similarly, if the device in the drawings is turned over, the elements described as being "above" the other elements will be oriented on the "lower" side of the other elements. Therefore, the exemplary term "above" may encompass the orientation of "above" and "below" depending on the particular orientation of the drawing.

"About", "approximately" or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Moreover, "about", "approximately" or "substantially" as used herein may select a more acceptable range of deviation or standard deviation depending on optical properties, etching properties, or other properties, without applying a standard deviation for all properties.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 1B:
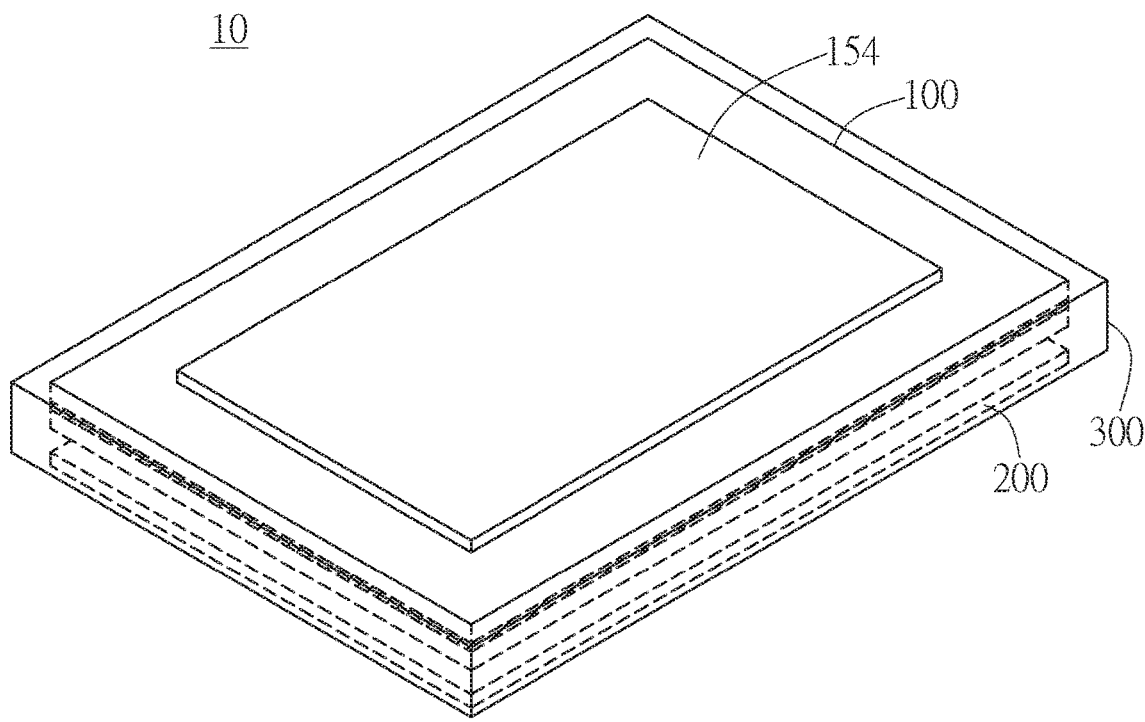
FIG. 1B is a schematic view of the display module of FIG. 1A.
Figure 1C:
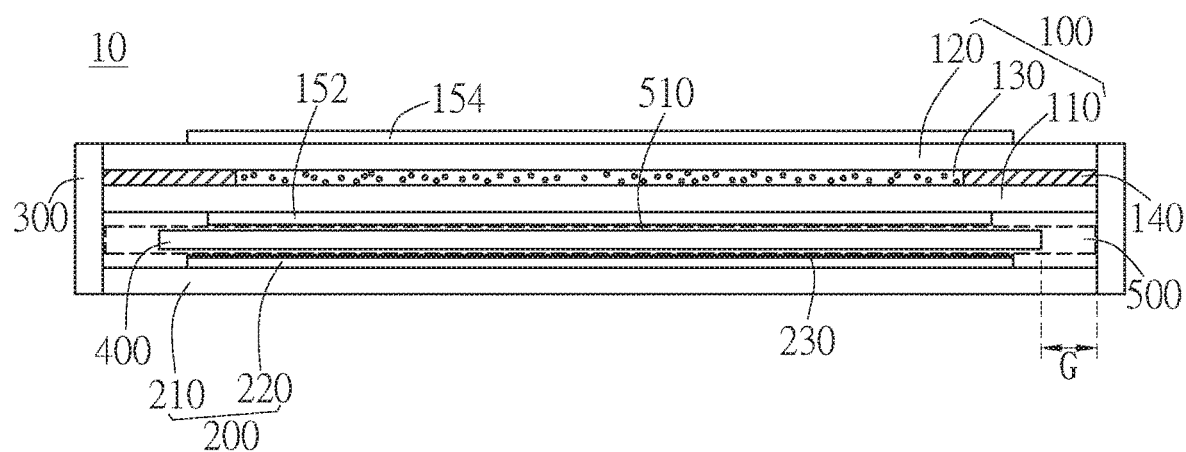
FIG. 1C is a cross-sectional view of the display module of FIG. 1B.

Referring to FIGS. 1A to 1C, FIG. 1A is an exploded view of an embodiment of the display module of the invention, FIG. 1B is a schematic view of the display module of FIG. 1A, and FIG. 1C is a cross-sectional view of the display module of FIG. 1B. As shown in FIGS. 1A to 1C, in an embodiment, the display module 10 includes a display panel 100, a wavelength modulation unit 200, an adhesive layer 300, and an optical film 400. The display panel 100 includes two substrates, such as a lower substrate 110 and an upper substrate 120, and a display medium 130 sandwiched between the two substrates 110, 120. The wavelength modulation unit 200 includes a carrier substrate 210 and a wavelength modulation layer 220 on the carrier substrate 210. The carrier substrate 210 has a coefficient of thermal expansion substantially matching coefficients of thermal expansion of the two substrates 110, 120. The adhesive layer 300 bonds the display panel 100 and the wavelength modulation unit 200 to form a space 500 between the display panel 100 and the wavelength modulation unit 200. The optical film 400 is interposed in the space 500 to be clamped between the display panel 100 and the wavelength modulation unit 200.

Specifically, the display panel 100 is constructed by a pair of substrates (e.g. 110 and 120) and the display medium 130 sandwiched between the lower substrate 110 and the upper substrate 120. For example, the lower substrate 110 can be a substrate with an array of pixels thereon, and the upper substrate 120 can be a substrate with a layer of color filters (or named a color conversion layer) thereon, but not limited thereto. In another embodiment, the two substrates of the display panel 100 can be a pair of substrates with electrical circuits or optical components for controlling the display medium 130 to display images. In an embodiment, the substrate, such as 110, 120, is preferably made of glass or plastics. The display medium 130 can be non-luminous materials, such as liquid crystals, electrophoretic capsules or other suitable materials, to construct a non-self-luminous display panel, but not limited thereto. In another embodiment, the display medium 130 can be self-luminous materials, such as organic light-emitting materials, inorganic light-emitting materials or other suitable materials, to construct a self-luminous display panel.

The display panel 100 may further include a light-blocking layer 140 and polarizers, such as a lower polarizer 152 and an upper polarizer 154, to provide the display panel 100 with a desired optical property. Specifically, the light-blocking layer 140 can be disposed on the lower substrate 110 or the upper substrate 120 and is preferably made of light-blocking materials to prevent the leakage of light. For example, the light-blocking layer 140 can be a black matrix, such as a black photoresist, but not limited thereto. The light-blocking layer 140 is configured to define the boundary of the display panel 100 and also to prevent interference of light between adjacent pixels. In an embodiment, with respect to the display medium 130, the lower polarizer 152 and the upper polarizer 154 are respectively disposed on the surface at another side of the lower substrate 110 and the upper substrate 120, such as the outer surface, and have corresponding polarization directions, such as liner polarization in which the polarization directions are perpendicular to each other, or circular polarization in which the polarization direction is counterclockwise or clockwise. As such, after the light enters the display panel 100 from the lower polarizer 152, by controlling the twist of liquid crystal molecules in the liquid crystal layer to rotate the polarization direction of the light, the light can be emitted from or blocked by the upper polarizer 154.

The optical film 400 can include a diffusion film, a prism film, a microlens film, a brightness enhancement film, or a combination thereof. The optical film 400 can be one or more optical film. Moreover, the optical film 400 can be a single optical film or a composite optical film with multiple optical films bonded to each other. For example, the optical film 400 can be a combination of a dual brightness enhancement film and a brightness enhancement film (DBEF+BEF), a combination of a dual brightness enhancement film and a prism-on-prism film (DBEF+POP), a combination of a diffusion film on a prism-on-prism film (DOPP), a combination of a microlens film on a prism-on-prism film (MOPP), or a combination of a dual brightness enhancement film on a prism-on-prism film (DBEF on POP), but not limited thereto.

The wavelength modulation unit 200 includes the carrier substrate 210 and the wavelength modulation layer 220 formed on the carrier substrate 210. The coefficient of thermal expansion of the carrier substrate 210 matches the coefficients of thermal expansion of the two substrates (e.g. 110, 120) to avoid the bending deformation of the two substrates 110, 120 and the carrier substrate 210 due to the mismatch of the coefficients of thermal expansion when the temperature of the display module 10 changes. For example, the carrier substrate 210 is preferably a glass substrate or a plastic substrate, and the material of the carrier substrate 210 can be same as or different from the materials of the two substrates 110, 120. In this embodiment, the carrier substrate 210 and the two substrates 110, 120 can all be glass materials and have a substantially same thickness, so that the coefficients of thermal expansion thereof are matched or substantially the same, but not limited thereto. In another embodiment, the thickness and material of the carrier substrate 210 can be selected based on the coefficient of thermal expansion of the substrate 110 or 120, so that the coefficients of thermal expansion of the carrier substrate 210 and the two substrates 110, 120 can be matched. In an embodiment, the largest coefficient of thermal expansion of the carrier substrate 210 and the two substrates 110, 120 is equal to or less than twice of the smallest coefficient of thermal expansion of the carrier substrate 210 and the two substrates 110, 120, so that the coefficient of thermal expansion of the carrier substrate 210 matches the coefficients of thermal expansion of the two substrates 110, 120 to avoid the bending deformation of the two substrates 110, 120 and the carrier substrate 210 when the temperature increases. In an embodiment, the coefficient of thermal expansion of the carrier substrate 210 at 20° C. is preferably larger than $1\times10^{-7}$ 1/K and less than $3\times10^{-5}$ 1/K, and the thickness thereof is, for example, 0.4 mm to 0.7 mm, but not limited thereto.

In an embodiment, the wavelength modulation layer 220 includes a quantum dot layer, which can be formed on the carrier substrate 210 by coating. For example, the wavelength modulation layer 220 can be formed on the carrier substrate 210 by spin-coating or bar-coating the wavelength modulation materials, such as quantum dots, diffusion materials, glues on the carrier substrate 210, to change the wavelength of light, so that the display module 10 can achieve a wide color gamut image display. In addition, the wavelength modulation unit 200 further includes an anti-water/oxygen layer 230 to protect the wavelength modulation layer 220 from contamination of moisture or air. In an embodiment, the anti-water/oxygen layer 230 substantially completely covers the wavelength modulation layer 220, and the anti-water/oxygen layer 230 has a moisture permeability equal to or larger than $1\times10^{-6}$ $g/m^2$ per day and smaller than 1 $g/m^2$ per day, but not limited thereto. According to the use environment of the display module 10, the anti-water/oxygen layer 230 can have a larger or smaller moisture permeability. In this embodiment, the anti-water/oxygen layer 230 can be a silicon nitride layer and can be formed by the deposition process to cover the wavelength modulation layer 220.

The adhesive layer 300 may include any suitable adhesive materials to bond the display panel 100 and the wave-length modulation unit 200. For example, the material of the adhesive layer 300 can include moisture curable adhesives (e.g. polyurethane reactive (PUR) glue, polyurethane (PU) glue), ultraviolet (UV) curable adhesives (e.g. UV glue), etc., but not limited thereto. In an embodiment, the adhesive layer 300 preferably has a Young's modulus of 4-500 MPa after curing, but not limited thereto. In an embodiment, the adhesive layer 300 can be a black adhesive layer to further enhance the light-shielding effect in addition to the bonding of the display panel 100 and the wavelength modulation unit 200. The adhesive layer 300 preferably is coated at least to the peripheral side surfaces of the display panel 100 and the wavelength modulation unit 200 after the wavelength modulation unit 200, the optical film 400, the display panel 100 is stacked from bottom to top, so that the optical film 400 is sandwiched between the display panel 100 and the wavelength modulation unit 200 and the lateral sides of the display panel 100 and the wavelength modulation unit 200 are bonded to form the display module 10.

Specifically, as shown in FIG. 1C, the adhesive layer 300 bonds the display panel 100 and the carrier substrate 210 of the wavelength modulation unit 200, so that the space 500 is formed between the lower substrate 110 (or the lower polarizer 152, if exists) of the display panel 100 and the wavelength modulation layer 220 (or the anti-water/oxygen layer 230, if exists) of the wavelength modulation unit 200. The optical film 400 is disposed in the space 500 in a manner that an air layer 510 is formed between the optical film 400 and the display panel 100 and/or between the optical film 400 and the wavelength modulation unit 200. In other words, the optical film 400 is interposed between the display panel 100 and the wavelength modulation unit 200 and is not adhered to the display panel 100 and the wavelength modulation unit 200. By controlling the application of the adhesive layer 300, the optical film 400 can have a gap with at least one of the display panel 100 (such as the lower substrate 110) and the wavelength modulation unit 200 (such as the wavelength modulation layer 220 or the anti-water/oxygen layer 230, if exists) to form the air layer 510.

In this embodiment, the adhesive layer 300 is only bonded to lateral sides of the display panel 100 and the carrier substrate 210 to facilitate the slim border design of the display module. In this embodiment, a gap G is preferably formed between the optical film 400 and the adhesive layer 300. That is, the two substrates 110 and 220 of the display panel 100 have a size equivalent to (or substantially same as) the size of the carrier substrate 210 of the wavelength modulation unit 200, so that the adhesive layer 300 is only bonded to the side surfaces of the adjacent lateral sides of the two substrates 110 and 220 and the carrier substrate 210. The size of the optical film 400 is preferably smaller than the size of the two substrates 110 and 220 and the carrier substrate 210, so that the gap G is formed between the optical film 400 and the adhesive layer 300 to provide the optical film 400 with a suitable expansion space without being deformed by the pressing of the adhesive layer 300, but not limited thereto. According to the material selection of the adhesive layer 300, the adhesive layer 300 may be flexible to absorb the expansion deformation of the optical film 400, so that even if the optical film 400 contacts the adhesive layer 300, the expansion of the optical film 400 is not affected by the adhesive layer 300.

Figure 2:
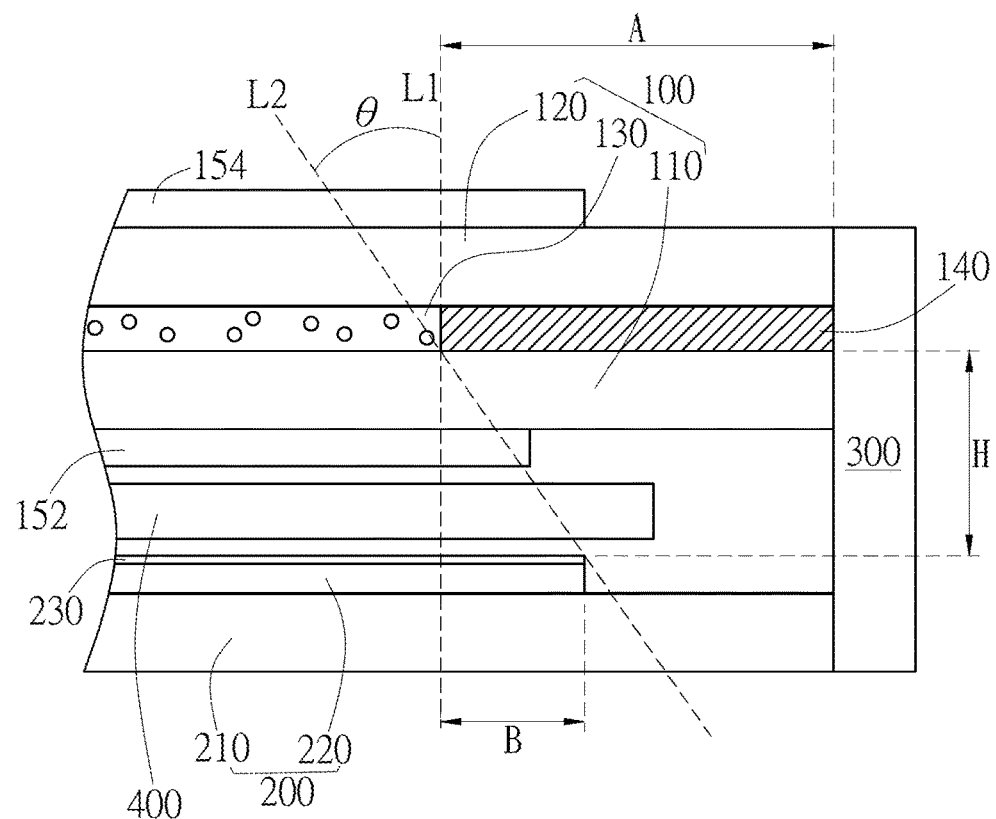
FIG. 2 is a partially enlarged side view of an embodiment of the display module of the invention.

FIG. 2 is a partially enlarged side view of an embodiment of the display module of the invention. As shown in FIG. 2, in the embodiment, the vertical projection of the light-blocking layer 140 preferably covers the lateral side of the wavelength modulation layer 220. Specifically, the wavelength modulation layer 220 preferably extends toward the edge of the display module to be under the border, i.e., to be right under the light-blocking layer 140, so that the wavelength modulation layer 220 and the light-blocking layer 140 at least partially overlap with each other in the display direction. Therefore, the display module can be properly shielded in the viewing angle of the viewer without revealing the internal structure. For example, a connecting line L2 from the lateral side of the wavelength modulation layer 220 to the lateral side of the light-blocking layer 140 includes an angle $\theta$ with the lateral side L1 of the light-blocking layer 140, and the angle $\theta$ ranges from 30 degrees to 60 degrees to effectively enhance the wavelength modulation of the wavelength modulation layer 220 and reduce the material amount of the wavelength modulation layer 220, but not limited thereto. In another embodiment, the wavelength modulation layer 220 can be applied to the entire surface of the carrier substrate 210 to omit the step of patterning the wavelength modulation layer 220.

Figure 3:
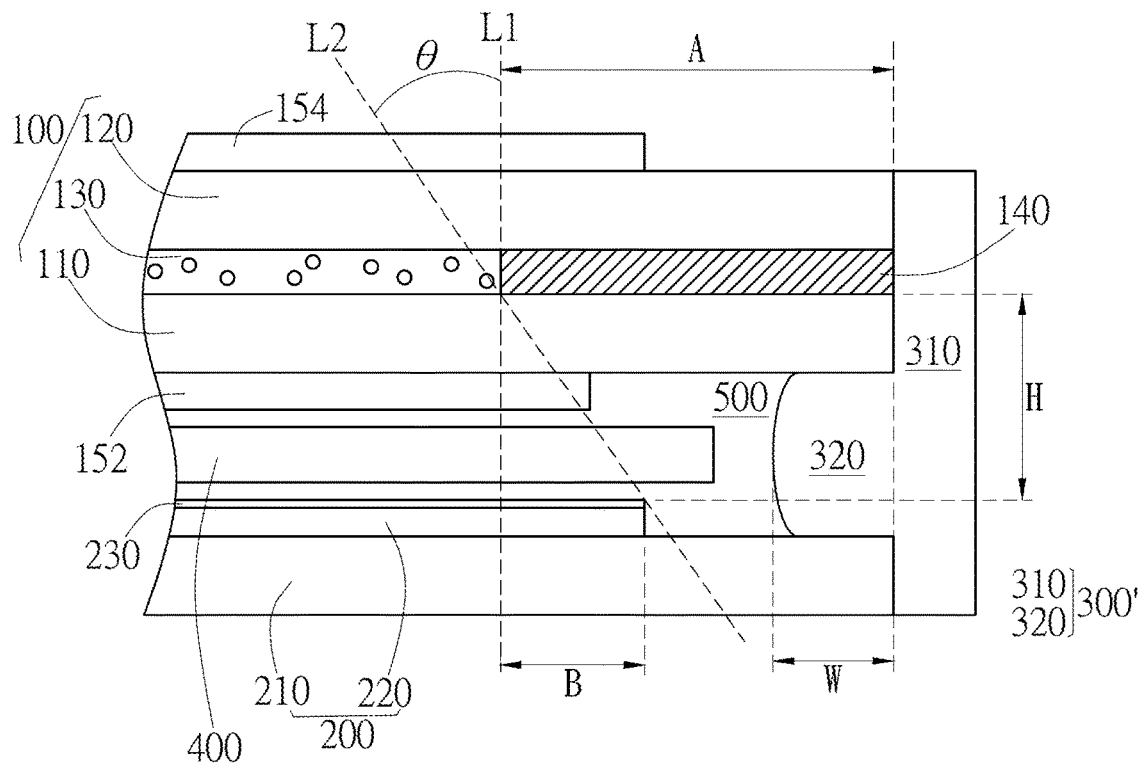
FIG. 3 is a partially enlarged side view of another embodiment of the display module of the invention.

FIG. 3 is a partially enlarged side view of another embodiment of the display module of the invention. As shown in FIG. 3, in this embodiment, the adhesive layer 300' includes a lateral portion 310 and an extension portion 320. The lateral portion 310 bonds adjacent lateral sides of the display panel 100 and the carrier substrate 210, and the extension portion 320 extends from the lateral portion 310 toward the space 500 to bond two facing surfaces of the display panel 100 and the carrier substrate 210. For example, by controlling the coating parameters of the adhesive layer 300', a portion of the adhesive 300' is bonded to the lateral surfaces of the display panel 100 and the carrier substrate 210 to form the lateral portion 310, and another portion of the adhesive 300' extends from the lateral side into the space between the facing surfaces of the substrate 110 and the carrier substrate 210 to form the extension portion 320, which is bonded to the lower surface of the lower substrate 110 and the upper surface of the carrier substrate 210.

It is noted that when the adhesive layer 300' is bonded to the lateral surfaces of the display panel 100 and the carrier substrate 210 and also bonded to the facing surfaces near adjacent sides of the display panel 100 and the carrier substrate 210, the width (W) of the extension portion 320 and the width (A) of the boundary defined by the light-blocking layer 140 preferably satisfies the following equation: 0<W/A<0.54. Therefore, the display module can achieve the lateral connection by the lateral portion 310 of the adhesive layer 300' and achieve the vertical connection between the two facing surfaces by the extension portion 320, which extends into the space 500 without affecting the default border design. Moreover, since the lateral connection is achieved by the lateral portion 310 of the adhesive layer 300', the width (W) of the extension portion 320 is not considered when designing the border.

Figure 4:
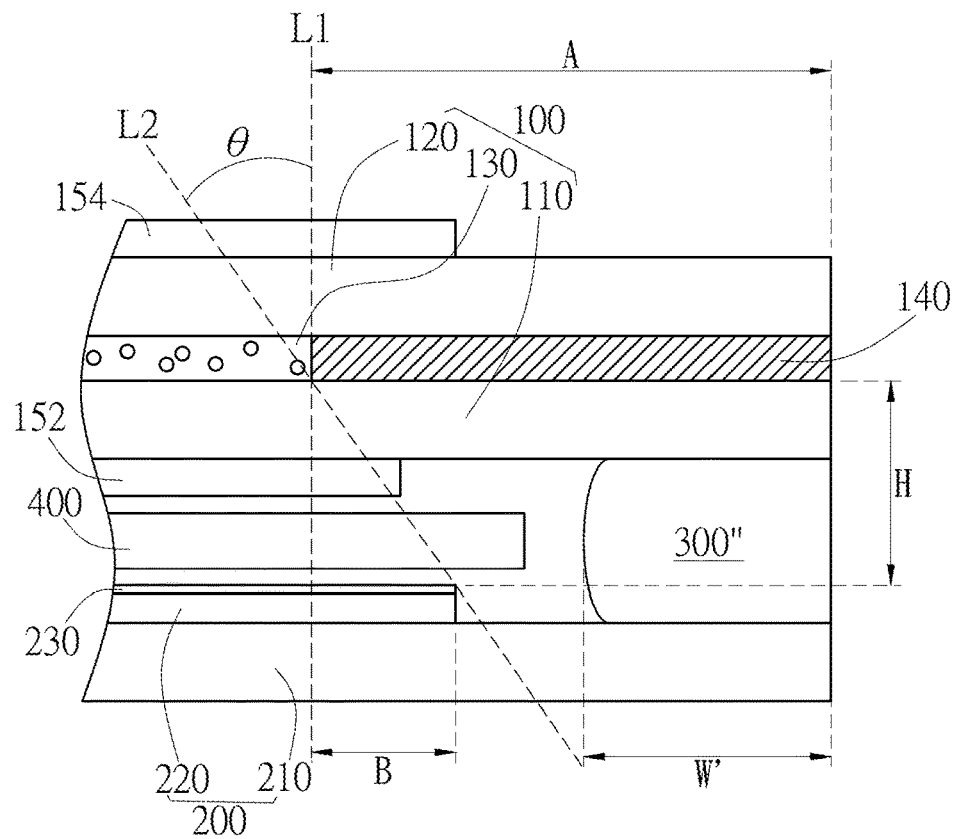
FIG. 4 is a partially enlarged side view of a further embodiment of the display module of the invention.

FIG. 4 is a partially enlarged side view of a further embodiment of the display module of the invention. As shown in FIG. 4, in this embodiment, the adhesive layer 300" can be disposed only between the display panel 100 and the carrier substrate 210 to bond the facing surfaces of the display panel 100 and the carrier substrate 210, such as the lower surface of the lower substrate 110 and the upper surface of the carrier substrate 210. That is, the adhesive layer 300" can be applied to one of the display panel 100 and the carrier substrate 210, such as applied to the upper surface of the carrier substrate 210, and the adhesive layer 300" is disposed within a vertical projection of the light-blocking layer 140. In this embodiment, the width (W') of the adhesive layer 300" and the width (A) of the boundary preferably satisfies the following equation: 0.26<W'/A<0.54. Therefore, the adhesive layer 300" can bond the display panel 100 and the wavelength modulation unit 200 without affecting the default border design.

Figure 5:
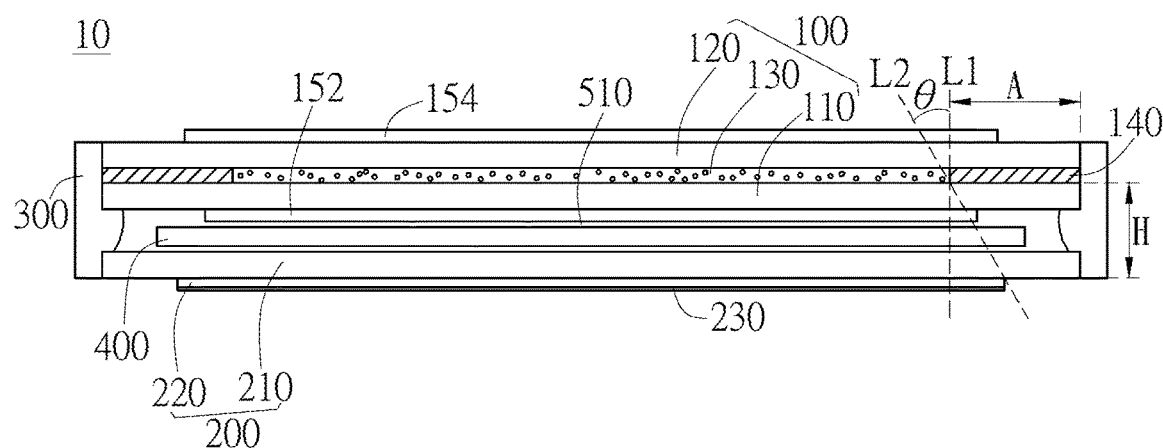
FIG. 5 is a cross-sectional view of another embodiment of the display module of the invention.
Figure 6A:
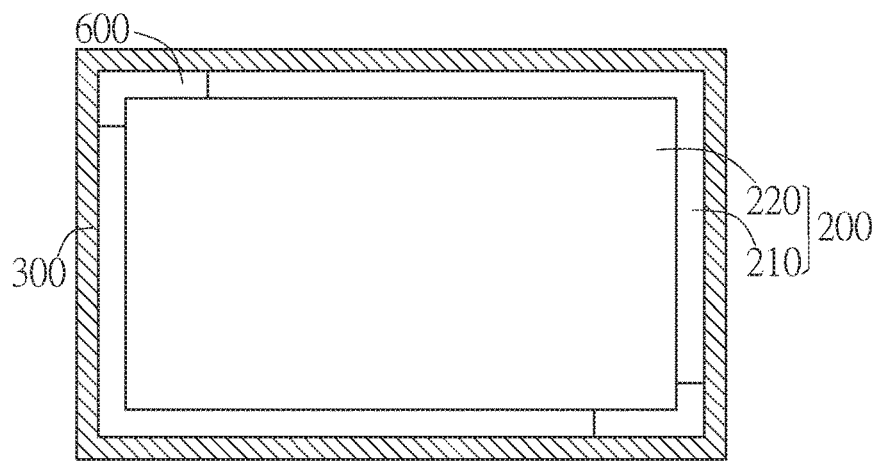
FIG. 6A to FIG. 6F are schematic views of variant embodiments showing the relative position of the positioning adhesive layer and the adhesive layer of the display module of the invention.
Figure 6B:
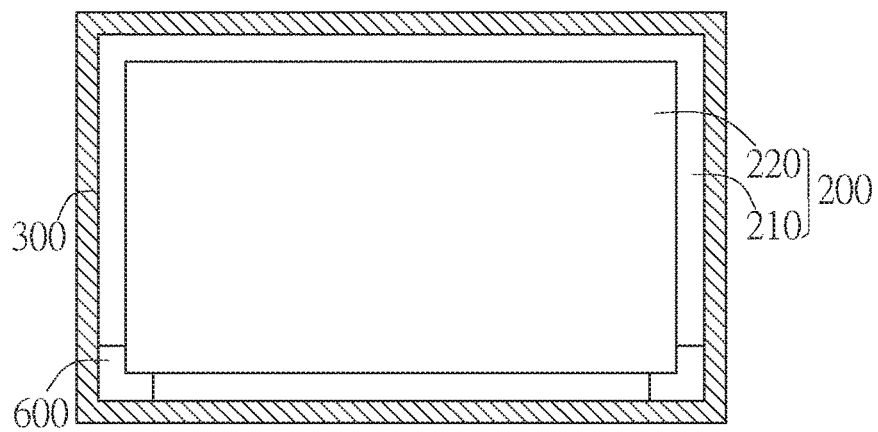
Figure 6C:
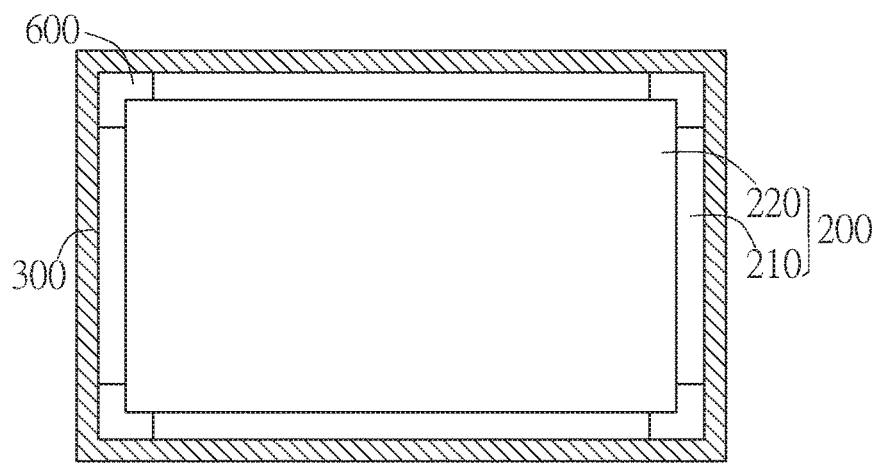
Figure 6D:
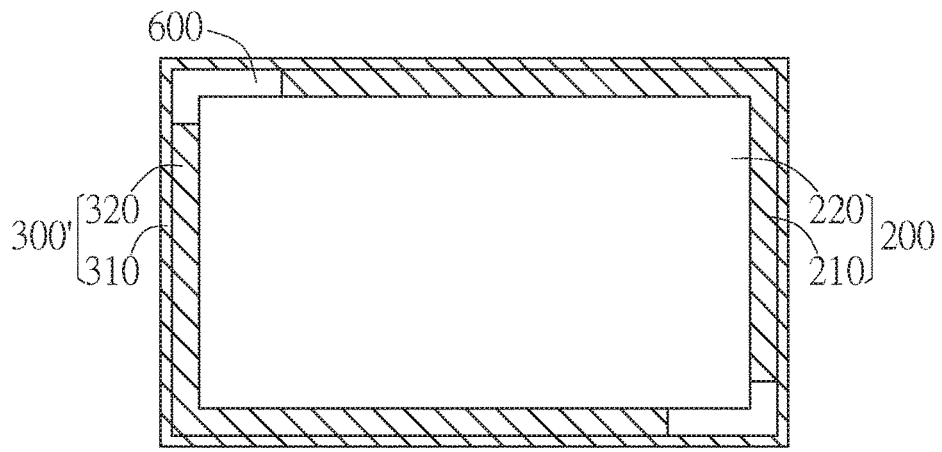
Figure 6E:
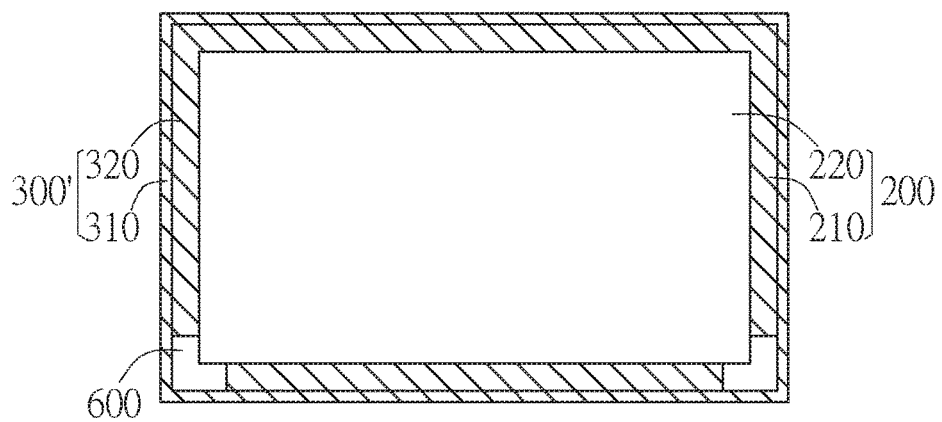
Figure 6F:
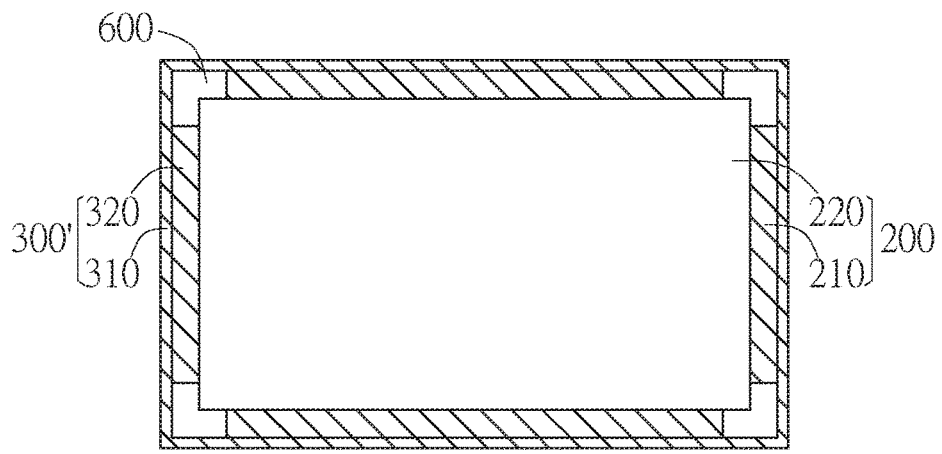

In the above embodiments, the wavelength modulation layer 220 is disposed on a side of the carrier substrate 210 that faces the display panel 100 and the space 500, but not limited thereto. FIG. 5 is a cross-sectional view of another embodiment of the display module of the invention. As shown in FIG. 5, in this embodiment, the wavelength modulation layer 220 is disposed on a side of the carrier substrate 210 that faces away from the display panel 100, i.e., on the outer side of the display module. Moreover, as shown in FIGS. 2-5, the wavelength modulation layer 220 and the light-blocking layer 140 at least partially overlap with each other in the display direction, and the width (B) of the overlapped area of the wavelength modulation layer 220 and the light-blocking layer 140 is defined as H*tan $\theta$, wherein H refers to the height between the wavelength modulation layer 220 and the light-blocking layer 140, and the angle $\theta$ is preferably 30 to 60 degrees. Moreover, the wavelength modulation layer 220 is preferably designed with a blank area to reduce the possibility of leaking light, such as blue light. In an embodiment, the width of the blank area (e.g. measured from the edge of the wavelength modulation layer 220 to the edge of the carrier substrate 210) is preferably larger than the width (W) of the extension portion 320 of the adhesive layer 300' or the width (W') of the adhesive layer 300", such that the wavelength modulation layer 220 is preferably not connected by the adhesive layer 300 (or 300', 300"). Moreover, the width of the blank area is preferably smaller than the value of subtracting the width (B) of the overlapped region of the wavelength modulation layer 220 and the light-blocking layer 140 from the width (A) of the light-blocking layer 140, i.e., W (or W')<the width of the blank area <A−H*tan $\theta$, and the angle $\theta$ is preferably 30 to 60 degrees.

FIG. 6A to FIG. 6F are schematic views of variant embodiments showing the relative position of the positioning adhesive layer and the adhesive layer of the display module of the invention. As shown in FIG. 6A to FIG. 6F, the display module further includes a positioning adhesive layer 600. When applying the adhesive layer 300 or 300' to the lateral sides of the display module, the positioning adhesive layer 600 is preferably pre-coated on at least one of the display panel 100 and the carrier substrate 210 to define a relative position of the display panel 100 and the wavelength modulation unit 200 and to facilitate the application of the adhesive layer 300 or 300' and the definition of the space 500. The positioning adhesive layer 600 and the adhesive layer 300 or 300' can have same or different materials, such as PUR, UV, or PU adhesives, and the positioning adhesive layer 600 can be disposed at a suitable location on the upper surface of the carrier substrate 210 or the lower surface of the lower substrate 110, such as two opposite corners shown in FIGS. 6A and 6D, two adjacent corners shown in FIGS. 6B and 6E, or four corners shown in FIGS. 6C and 6F, but not limited thereto. According to practical applications, the positioning adhesive layer 600 can be disposed at only one corner or at adjacent sides.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A display module, comprising:
    a display panel comprising two substrates and a display medium sandwiched between the two substrates, the display panel further comprising a light-blocking layer between the two substrates around the display medium to define a boundary of the display panel;
    a wavelength modulation unit comprising a carrier substrate and a wavelength modulation layer on the carrier substrate, the carrier substrate having a coefficient of thermal expansion substantially matching coefficients of thermal expansion of the two substrates;
    an adhesive layer bonding the display panel and the wavelength modulation unit to form a space between the display panel and the wavelength modulation unit; and
    an optical film interposed in the space to be clamped between the display panel and the wavelength modulation unit,
    wherein a vertical projection of the light-blocking layer on the carrier substrate covers a lateral side of the wavelength modulation layer, so that the light-blocking layer overlaps the wavelength modulation layer in a display direction of the display panel;
    wherein the adhesive layer comprises a lateral portion bonding lateral sides of the display panel and the carrier substrate and an extension portion extending from the lateral portion toward the space to bond two facing surfaces of the display panel and the carrier substrate.

2. The display module of claim 1, wherein the largest coefficient of thermal expansion of the carrier substrate and the two substrates is equal to or less than twice of the smallest coefficient of thermal expansion of the carrier substrate and the two substrates to match the coefficient of thermal expansion of the carrier substrate with the coefficient of thermal expansion of the two substrates.

3. The display module of claim 1, wherein the optical film is disposed in the space in a manner that an air layer is formed between the optical film and the display panel or between the optical film and the wavelength modulation unit.

4. The display module of claim 1, wherein a width (W) of the extension portion and a width (A) of the boundary satisfies the following equation:

$$0<W/A<0.54.$$

5. The display module of claim 1, further comprising a positioning adhesive layer pre-coated on at least one of the display panel and the carrier substrate to define a relative position of the display panel and the wavelength modulation unit.

6. The display module of claim 1, wherein a connecting line from the lateral side of the wavelength modulation layer to a lateral side of the light-blocking layer includes an angle with the lateral side of the light-blocking layer, and the angle ranges from 30 degrees to 60 degrees.

7. The display module of claim 1, wherein the wavelength modulation layer is disposed on a side of the carrier substrate facing the display panel.

8. The display module of claim 1, wherein the wavelength modulation layer is disposed on a side of the carrier substrate facing away from the display panel.

9. The display module of claim 1, wherein the wavelength modulation layer comprises a quantum dot layer.

10. The display module of claim 1, wherein the optical film comprises a diffusion film, a prism film, a microlens film, a brightness enhancement film, or a combination thereof.

11. The display module of claim 1, wherein the wavelength modulation unit further comprises an anti-water/oxygen layer covering the wavelength modulation layer, and the anti-water/oxygen layer has a moisture permeability equal to or larger than $1\times10^{-6}$ g/m$^2$ per day and smaller than 1 g/m$^2$ per day.

12. The display module of claim 1, wherein the adhesive layer comprises a moisture curable glue or an ultraviolet curable glue.

* * * * *